United States Patent Office 3,231,657
Patented Jan. 25, 1966

3,231,657
METHOD OF CURING CALCIUM SILICATE INSULATING MATERIALS
George L. Kalousek, Gary, Ind., assignor to Owens-Corning Fiberglas Corporation, a corporation of Delaware
No Drawing. Filed Dec. 28, 1962, Ser. No. 247,818
17 Claims. (Cl. 264—333)

The insulating materials of the calcium silicate type, to which the present invention pertains, are generally known in the art as are several methods of producing them. In general, these insulating materials are formed by reacting lime, silica and water under indurating conditions, e.g. elevated temperatures and saturated steam pressure, and appropriate preselected ratios to yield, after a given time interval, a dry, solid, relatively light, e.g. 3 to 50 pounds per cubic foot, insulative product which is desirably utilized as a pipe covering, a block material or a core material for certain construction applications. These materials are principally desirable by reason of their low coefficient of heat transfer and their structural integrity even at relatively elevated temperatures above 1,000° F.

The lime, silica and water are usually first formed into a slurry which is introduced into a shallow container to form sheets or a somewhat deeper container to form blocks. In such instances, the container is in effect serving as a mold. In other instances, generally shallow arcuate mold halves are used in conjunction with cylindrical cores which fit partially down into the arcuate channel whereby the ultimately induration hardened reaction product takes the form of a linear arcuate section, two of which can be used to embrace a cylindrical pipe desirably insulated from the surrounding atmosphere.

The term induration cycle (sometimes referred to as induration conditions) as used herein is meant to designate the time, temperature and pressure conditions within an autoclave into which the slurry, located in the pans or molds, is introduced for the heat reaction step. The indurating conditions may vary depending upon the ratio of the reactants, the relative proportion of water to solids, the particular formulation and the desired properties of the ultimate product. Usually when the pans or molds are placed in the autoclave, it is closed and heat is applied whereupon the temperature within the autoclave rises and the excess water begins to evaporate. By excess water is meant water not entering into the reaction itself. The pressure is allowed to build up to the desired saturated steam pressure necessary to achieve a successful induration whereupon a preadjusted relief valve serves to maintain a constant steam pressure and its corresponding temperature. Induration cycles may involve pressures as low as 75 pounds per square inch gauge, the latter having a corresponding temperature of about 320° F. to a pressure of 400 pounds per square inch gauge, the latter having a corresponding temperature of 448° F. Furthermore, the induration cycle may be adjusted anywhere from one hour upwards to 15 hours. In general, the shorter the time of induration, the higher pressure and temperature that is utilized.

In the production of calcium silicate insulating materials, as described hereinabove, difficulty is usually experienced in the removal of the induration hardened calcium silicate insulating material from the pans or molds. The removal of the insulating material from the mold is essentially a hand operation except as sometimes augmented by the use of auxiliary tools. The difficulty referred to is usually evidenced by a sticking of the piece in the mold or pan so that it must be cracked or broken in order to remove it. This sticking in the mold resulting in "off ware" also delays the overall operation.

In attempts to reduce or eliminate the damage to the ultimate insulating material during its removal from the mold there has arisen the practice of employing paper inserts or spacers in the pans or molds. The paper inserts obviously function as to occupy a small part of the volume of the mold. As a consequence, when the paper inserts are consumed, e.g. burned up, during the autoclaving or a final drying step, a space or void is left in the mold permitting the solid insulating material to be removed therefrom. The use of inserts, however, is costly in materials. Furthermore, the use thereof is to a certain extent dangerous since the burning of the paper inserts creates a hazard of the possible spread of the fire to other combustibles. Additionally, the portions of insulating material immediately proximate to the burning paper insert becomes discolored, unsightly and therefore undesirable.

Accordingly, it is a principal object of the present invention to provide a novel method of producing calcium silicate type insulating materials, which method results in a product which is easily removed from the shallow containers or molds without encountering breakage or any damage of the insulating material in so doing.

It is also an object of the present invention to provide a method of producing lime silica type reaction products which may be carried out in a shorter time than known heretofore.

It is likewise an object of the present invention to provide such a method which yields a product whose physical properties, in terms of strength, heat conductivity, density and the like, are in no ways adversely affected by the reason of the shorter cycle and additionally enhanced by the fact that the product is more easily removed from the shallow pans, molds or containers.

It is yet another object of the present invention to provide a method of producing insulating materials of the calcium silicate type which is more economical in terms of the savings accruing through elimination of the paper inserts, as well as through the provision of a shorter time cycle for the complete reaction.

It is also an object of the present invention to provide a method which permits the achievement of all the above-enumerated desiredum without any deleterious effects such as reduction in certain physical properties of the ultimate product of the process, e.g. the calcium silicate insulating material.

Many other objects, as well as the manner of achieving them, will become apparent to those skilled in the art from the following detailed description taken in conjunction with the included recitation of examples; the latter being detailedly set forth as the best and preferred mode of practicing the invention in accordance with the requirements of the patent statutes.

In accordance with the simplest embodiment of the present invention, I envision a method of producing insulating materials of the calcium silicate type, such method comprising the steps of reacting an aqueous slurry of lime and silica under indurating conditions (elevated temperature and pressure) for a preselected time capable of yielding a solid integrated three-dimensional network of microcrystalline structure, simultaneously exposing said reactant slurry to an atmosphere of superheated steam, particularly during the initial phase of said induration cycle and preferably before the ultimately desired pressure of induration is reached and thereafter finally removing the reaction product from the zone of induration. In accordance with a preferred aspect of the present invention, I very carefully control the time of exposure to the superheated steam and the temperature of the superheated steam and also control carefully the phasing of the superheat cycle in relation to the overall induration cycle.

The invention, as well as the preferred manners of practicing it, will become more clearly evident from the following examples. In these examples the amounts of ingredients in the listed formulations are expressed as parts by weight unless otherwise noted.

*Example I*

The following materials are combined in a suitable container provided with a mild mixing element or the ingredients may be hand mixed by utilizing a wooden paddle.

| Material: | Parts by weight |
| --- | --- |
| Quick lime (94% CaO) | 140 |
| Tripoli (99% $SiO_2$) | 56 |
| Diatomaceous earth (83% $SiO_2$) | 135 |
| Asbestos | 81 |
| Clay (pulverized) | 16 |
| Inerts, e.g. limestone, etc. | 90 |
| Dispersing agent | 0.5 |
| Water | 2,900 |

The above ingredients are added together, preferably the solids being added to the water. In some cases it may be desirable to heat a portion of the water separately, thereby expediting the solubilizing of the lime therein. When mixed, the slurry, which will have a viscosity which may be likened to that of cream, is poured into a shallow pan measuring 36" x 18" x 4" defining a cavity formative of a piece of flatware. The shallow pan is then introduced into an autoclave equipped with an internal array of steam pipes connected to an outside steam source and also to an outlet for condensed water. The autoclave is closed and the heat emanating from the steam heated pipes serves to gradually raise the temperature of the slurry sufficiently to initiate a reaction of the lime and silica and also to evaporate excess water. The excess water forms a saturated steam atmosphere within the autoclave which is maintained as a closed chamber except for a relief valve and an inlet pipe which is closed except during the introduction of superheated steam in accordance with the invention as described hereinafter in Example II.

After about 30 minutes time, the pressure within the autoclave measures 110 p.s.i.g., at which pressure the relief valve is adjusted to maintain said pressure relatively constant. The induration conditions of 110 p.s.i.g. and a corresponding temperature of 320° F. are continued for 13 hours. Thereafter, the pan is removed from the autoclave and it is found that the resultant reaction product is solid and composed of an integrated crystalline network. The pans are then dried in another warm air (300° F.) chamber for a time to remove residual moisture. Upon cooling, the product, however, is found to be firmly stuck within the pan and can only be removed by cracking portions of the product away. The density of a piece after removal is checked and is found to measure approximately 12 pounds per cubic foot. The product is structurally sound (except for the damage incurred in removal) and is stable to elevated temperatures in the 1200° F. range. This example demonstrates the difficulty experienced in normal production operations. Heretofore, this difficulty has only been partially avoided by the use of paper inserts at one or more sides of the pan as alluded to hereinbefore.

*Example II*

The procedure of Example I including the formulation therein given was repeated, excepting that superheated steam measuring 550° F. was introduced in the autoclave during the initial phase of the induration cycle, e.g. during the 30 minutes that the pressure is building up to 110 p.s.i.g. Specifically, superheated steam was introduced for a 15 minute period of the 30 minute cycle. Upon completion, the pan was removed from the autoclave and cooled. Thereafter, the product was very easily removed from the pan by hand. The product was checked and found to measure about 12 pounds per square inch in density. It was also composed of an integrated crystalline network representing a reaction product of lime, silica and water. The product is structurally sound with no cracks or damage incurred in removal from the pans and is stable to elevated temperatures in the 1200° F. range.

The superheated steam is produced by passing boiler steam and that formed by evaporation of water from the slurries through a multiple-tube heat exchanger in which "Dowtherm liquid" is circulated through the inner pipes or coils. The superheated steam is circulated by a fan over the heat exchanger coils and in turn over the partially formed "ware" in the shallow pan. This example demonstrates the practice of the invention and the desirable results flowing therefrom.

*Example III*

The following ingredients were combined in a suitable container and mixed uniformly to an even consistency.

| Product: | Parts by weight |
| --- | --- |
| Hydrated lime (73% CaO) | 180 |
| Tripoli (99% $SiO_2$) | 220 |
| Asbestos | 100 |
| Inerts, e.g. limestone | 2 |
| Water | 1,360 |

When mixed, the slurry had a consistency approximating that of a thick cream which was poured into a shallow pan as in the previous Example I. In the above formulation and particularly the ratio of water to solids is adjusted to yield a somewhat higher density product. The pan was introduced into an autoclave as before where elevated temperature is achieved by means of the circulation of steam through the internal array of pipes therein. The rate of heating is adjusted in order that the pressure within the autoclave will climb to approximately 250 pounds per square inch gauge in about 1 hour. These induration conditions are continued for approximately 6 hours total. In accordance with this invention, while the autoclave is being built up to the 250 p.s.i.g. pressure, superheated steam measuring 550° F. is introduced over a 30 minute period of the 60 minute pressure "up-cycle" period. Thereafter, the superheated steam is discontinued and the induration cycle is allowed to proceed. The pan is then removed from the autoclave. The resulting product is composed of an integrated microcrystalline network definitive of a cellular solid. The product is very easily removed from the mold, either immediately or after it has been allowed to cool completely down to room temperature. A piece of the product was sawed off for a density determination. It was found to have a density of about 20 pounds per cubic foot. Further examination of the insulating material revealed it to be essentially composed of crystalline xonotlite (excepting for the asbestos). The material was found to be stable, structurally sound and insulative in character at temperatures up to and including 1800° F., all without degradation or breakdown.

*Example IV*

The procedure of the immediately preceding Example III and the formulation therein included was repeated with the exception that superheated steam was not introduced into the autoclave. At the end of the induration cycle, exactly as described in the preceding example, the pan was removed from the autoclave and it was found that the product could not be stripped from the mold without physically breaking the reaction product contained therein.

*Example V*

The procedure, including the formulation, of Example III was repeated, except that the temperature of the superheat introduced was adjusted to 500° F. The properties of the resulting product were comparable to those of Example III and was equally easy to remove from the mold.

*Example VI*

The procedure of Example III, including the formulation therein given, was repeated, excepting that the temperature of the superheated steam was adjusted to measure 580° F. In addition, the temperature within the autoclave was adjusted upward sufficiently that the "up-cycle" time to 250 p.s.i.g. was reduced to 30 minutes instead of 60 minutes. The superheat was introduced contemporaneously with the pressure "up-cycle." Thereafter, the induration was allowed to proceed as before and finally at the completion thereof the pan was removed from the autoclave. Examination of the product revealed an insulating material having properties identical to that found with product of Example III. Furthermore, the product was very easily removed from the mold. This example demonstrates that the practice of the present invention allows the "up-cycle" phase, e.g., the initial phase of the induration cycle, to be reduced by one-half, e.g., from 60 minutes down to 30 minutes, without deleteriously effecting the resultant product and in addition providing for easy removal of the product from pans, molds, etc.

*Example VII*

The following ingredients were combined in a suitable mixer and uniformly stirred to a uniform consistency.

| Material: | Parts by weight |
|---|---|
| Quick lime (94% CaO) | 175 |
| Tripoli (99% $SiO_2$) | 175 |
| Asbestos (a mixture of ⅓ chrysotile and ⅔ amosite) | 140 |
| Inerts, e.g. limestone | 2 |
| Water | 2,350 |

After a mild uniform mixing, the slurry having the consistency of cream was introduced into a shallow pan as before. The pan was introduced into an autoclave wherein the temperature is controlled to bring the pressure within the autoclave to 250 p.s.i.g. in a period of 30 minutes. Simultaneously, superheated steam measuring 550° F. was introduced into the autoclave in the same manner as in Example II. At the end of 30 minutes, the superheated steam was discontinued and the induration cycle continued for a total period of 11 hours. The temperature within the autoclave measured 406° F., that being the corresponding temperature of the saturated steam at the 250 p.s.i.g. level. At the end of the induration cycle, the autoclave was opened and the shallow pan removed. The resulting integrated microcrystalline product was very easily removed from the pan. A piece of the product insulating material was separated and, when tested, was found to measure 20 pounds per cubic foot in apparent density. Other specimens revealed themselves to be structurally sound and insulative at exposures in the 1800° F. range.

*Example VIII*

The procedure in accordance with Example VII hereinabove was repeated utilizing the same formulation and differing only in the fact that the superheated steam was not introduced into the autoclave until it had been at equilibrium pressure of 250 p.s.i.g. and a corresponding temperature of 406° F. for 30 minutes. This example, like Example VII, involved a 30 minute "up-cycle" time to the 250 p.s.i.g. pressure. After 30 minutes introduction of the superheat, such was discontinued and the induration cycle allowed to proceed. Subsequently, the pan was removed from the autoclave and it was found that the product was difficult to remove from the pan or mold.

This example demonstrates that in accordance with a preferred embodiment of the invention the superheated steam must be introduced at a proper time, preferably prior to the achievement of the ultimate indurating pressure, in order that the desirable results provided by the invention are achieved.

*Example IX*

A mixture of ingredients as given in Example VII was prepared. This was poured into a shallow pan and placed in an autoclave. The conditions in the autoclave were adjusted so that the induration pressure approached 110 p.s.i.g. but did not exceed it. During the "up-cycle" to 110 p.s.i.g., superheat was introduced measuring 550° F. The induration continued as in Example VII. Thereafter, the pan was removed from the autoclave. It was found that the product, although formed and similar in appearance to the product in Example VII, was difficult to remove from the pan. This example demonstrates that with certain formulations, e.g. those containing no diatomaceous earth and those in which lime and silica are present in equi-molar amounts, the induration cycle must include pressures of about 250 p.s.i.g. and corresponding temperatures of 406° F. before the addition of superheat will be instrumental in providing easy removability of the resulting insulation material product from the pan or mold.

The practice of the invention as described herein yields a product which in addition to its easy removability is possessed of properties equal to those of products produced without the employment of controlled superheat. Precise measurement of the pieces in pans or molds where the method of the invention has been practiced reveals that the product has experienced a very slight degree of shrinkage. Measurement of the insulation products, in accordance with the examples representing the practice of the invention, revealed a shrinkage varying from about 0.04 inch to 0.14 inch per 36 inch dimension. This constitutes a shrinkage of from about 0.10% to 0.40%, which has been determined in accordance with the invention to be eminently desirable in providing ready and easy removal of the final product without any attendant adverse effect on product properties or performance.

The advantages accruing through the properly timed or phased introduction of superheated steam into an autoclave into mild contact with the reactants prior to solidification has also been demonstrated in connection with the forming of slurry mixtures, of lime and silica, into contours defining pipe insulation members as well as blocks and other forms.

In general, in the practice of the invention the initial slurry of water, lime and silica may vary considerably in viscosity from a very fluid viscosity approximating water to a relatively thick cream-like viscosity (often referred to as consistency) depending upon (a) the mol ratio of the reactants, e.g. lime/silica ratio, (b) the particle size of the silica, (c) the particle size of the asbestos and/or other fillers, (d) the amount of water and (e) the relative amounts of asbestos or other filler. By employment of a variety of known techniques, the slurry can be formed into a wide variety of shapes depending upon the ultimate application.

The relative mol ratio of lime and silica in the slurry will determine the character of the product resulting from any previously predetermined induration cycle. Generally, the lime and silica should be present in the ratio of at least 0.65 mol CaO to 1.0 mol $SiO_2$ in order to produce a crystalline integrated form of calcium silicate. It is usually preferable that the ratio of CaO to $SiO_2$ be above the 0.65:1.0 value. Thus, where the lime and silica are combined in such proportions as 0.83 to 1.0, respectively, the product of induration will be found to have the structure of tobermorite with the formula $5CaO \cdot 6SiO_2 \cdot 5H_2O$. On the other hand, when the amount of lime and silica is adjusted so that the ratio falls between 4:5 and 5:5 (lime/silica) and the water component of the slurry is initially saturated with respect to the lime and has been so maintained, then the product, involving a continuous dissolution of the lime and the continuous reaction thereof with the silica component, will proceed to yield an initial product having the formula $2CaO \cdot SiO_2 nH_2O$ which converts through a sequence of reactive hydrous silicates of lime to the formation of tobermorite having the formula hereinabove indicated and thence finally to form crystalline xonotlite having the formula $5CaO \cdot 5SiO_2 \cdot H_2O$. While the tobermorite on the one hand is characterized by a generally plate-like crystalline structure, the xonotlite is characterized by long, thin, lath-like crystals. In either case, the structure is characteristically open, porous and crystalline. In addition, it is strong and resilient while at the same time refractory to high temperatures and of uniform low heat conductivity throughout. Xonotlite containing less water of hydration than tobermorite is more dimensionally stable at high temperatures and is relatively chemically inert.

In accordance with the present invention, where the formulation selected is such as to yield a lime/silica ratio in the neighborhood of from about 0.87 to about 1.00, it is necessary that the induration reaction be so adjusted that the induration pressure falls in the neighborhood of 250 p.s.i.g. with a corresponding temperature of about 406° F. On the other hand, when the lime and silica are combined in a smaller ratio, e.g. below about 0.9, then it is satisfactory, in accordance with the practice of the present invention, for the induration to proceed at 150 p.s.i.g. and the corresponding saturation temperature. In such instances, it is usually desirable to employ a subsequent and separate hot air drying step in order to remove the residual moisture frequently associated with the lower pressure and temperature induration cycle. At the same time, it is a particular feature of this invention that the superheat addition takes place at the initial phase of the induration cycle and, most preferably, before the ultimate pressure of the induration cycle is reached, e.g. usually during the first 30 to 60 minutes of the induration cycle.

The density of the calcium silicate insulating material depends essentially upon the amount of water originally included with, or combined with, the finely divided solids in the formation of the slurry. Furthermore, the density is generally and conveniently expressed in pounds per cubic foot. In general, in lower density type of insulating materials, e.g. in the range of 15 pounds per cubic foot and lower, it is necessary to utilize a greater quantity of water. A water to solids (the total of lime, silica, filler, etc.) ratio of about 3 to 1 will give an approximately 21 pounds per cubic foot density product, while the ratio 6 to 1 of water and solids yields an approximately 11 pounds per cubic foot density product. It is also possible to utilize a ratio of 1 to 1 solids to water or water to solids to yield a 50 pounds per cubic foot product, while the ratio of 9 to 1 of water to solids will yield a product of extremely low density, e.g. in the neighborhood of 3 pounds per cubic foot.

Asbestos fiber is generally and desirably included in the formulation to aid in achieving a uniform suspension, thus preventing settling of the solids of lime and silica in the slurry. Furthermore, the asbestos aids in maintaining a proper dispersion of all of the ingredients in the slurry. A highly spiculated asbestos is desirable in supporting or suspending the solids or other granular components as a fine dispersion for at least a period of time sufficient to permit initiation of a gel phase of the lime and silica reactants, which gel will thereafter retain the solids in their proper dispersion.

As indicated hereinabove, the induration involving heat and pressure effects gradual removal of a substantial portion of the water component of the initial slurry. This leaves voids among the integral crystalline and lath-like network constituting the integral reaction product between the lime and silica. The final product, accordingly, when properly formulated and properly processed as described herein yields a permanent three-dimensional network of microcrystalline lath-like structure having a random configuration. The elimination of the excess water during the induration cycle serves to leave a volume of voids in the network which is greater than the volume of lath crystals.

It is frequently desirable to employ a post drying operation in the production of the calcium silicate type insulating materials. Thus, with those formulations calling for a high proportion of water to give a low density product, it is sometimes found that residual moisture is present even after a relatively rigorous induration cycle. While longer residence in the autoclave would drive off this residual moisture, it is generally more economical to transfer the molds or pans to a mild hot air oven or room, thus relieving the autoclave for induration (temperature and pressure) reaction of fresh calcium silicate slurry.

Preferably, in accordance with this invention, the temperature of the introduced superheated steam should be within the range of about 450° F. to about 600° F. Below this temperature the desirable results in terms of shorter cycle and easier removal of product is not noted. Furthermore, superheat temperatures above 600° F. level provide heat in excess of that necessary to accomplish the desired results and frequently result in products having stress and/or strain defects including obvious cracking. Most preferably, in order to achieve to optimum in control of the degree of shrinking such that removability is assured without stress cracking, temperatures of superheat in the range of 500° F. to 580° F. are most preferred.

It is considered quite surprising that the technique of the invention permits the attainment of the objectives and results noted hereinabove. For purposes of summary, it may be noted that these objectives and results include the feature that the resultant dry insulation product can be easily removed from shallow pans, molds or other containers. Furthermore, the overall induration cycle can be reduced in time whereby the efficiency of the operation is enhanced. The operation, as described, while semi-continuous in nature is essentially batch-like or step-like in the autoclave and, accordingly, it makes the production more economical per unit of production. It was considered surprising that the efficacious results were obtained since superheat would have normally been expected to lead to too rapid a drying whereby stress and/or strain conditions would occur and/or violent cracking would result. Previous experiments with more rigorous induration cycles revealed that this would be expected.

While it is not intended to be bound by any theory, it is theorized and believed that the mechanism by which the advantageous results are obtainable proceeds as follows. Thus, in a preferred manner of practicing my invention I introduce the superheat during an initial phase of the reaction between the lime and silica components. As indicated hereinabove, this reaction proceeds in several stages, one of which includes therein a gel-like phase. It is also suspected that the addition of the superheat tends to remove water from the upper surface layers of the exposed slurry causing the water level to drop. At the same time, capillary forces are tending to cause the water within the very thin passageways or pores to rise. Thus, the combination of the descent of the water level by removal of the surface water and the upward pull of the water by bayillary action may be productive of a combination of forces tending to compress the intermediate reaction product inwardly from the top and also from the sides. Since it has been theorized that initial heat reaction stages are inclusive of a gelatinous phase, these forces will permit a compression of the body or in effect a controlled shrinkage. Whether or not this theory is sound has not been proven incontrovertibly, and is not to be considered the foundation of this invention. On the other hand, certain of the above examples tend to substantiate the theory. Attention, for example, may be directed to Example VIII wherein the super-heat was not introduced until some time after ultimate indurating temperature and pressure had been achieved. It is suspected that at such time the gelatinous phase has disappeared and the rigid network of bonded crystals has already been formed. Consequently, no compressible matrix or gelatinous phase would exist upon which the compressive forces could exert themselves. To the contrary, the compressive forces, if sufficient, would, instead of reducing the volume of the slurry or forming body, tend to result in the cracking of the body as frequently occurs in overheating.

While in accordance with the patent statutes, I have disclosed my invention in considerable detail, particularly having set forth particular examples, I do not intend to be solely limited thereto since the examples and description are primarily for the purpose of enabling others to practice my invention and to disclose the preferred mode thereof. Obvious modifications of formulation, substitution of materials and modifications of technique are, accordingly, to be considered as included within my invention unless specifically excluded by the appended claims.

I claim:

1. The process of producing a calcium silicate reaction product which comprises reacting an aqueous slurry including lime and silica under indurating conditions for a sufficient time as to yield a solid integrated microcrystalline structure, said reaction proceeding with the formation of an initial gelatinous phase followed by conversion to said integrated structure, comprising introducing a stream of superheated steam during said induration and while said initial gelatinous phase still exists, and finally removing the reaction product from the reaction zone.

2. The process of producing a formed dry, solid insulating material of the calcium silicate type comprising the steps of:
   preparing a slurry mixture including lime, silica and water,
   locating said slurry in a mold,
   providing a closed chamber,
   locating said slurry-containing mold in said closed chamber,
   establishing a saturated steam atmosphere within said chamber in order to promote steam induration reaction of said slurry reactants, but
   prior to said establishment,
   flowing superheated steam into said chamber,
   discontinuing the flow of said superheat once the saturated steam atmosphere is established, then
   continuing saturated steam induration reaction of said slurry reactants to convert said slurry reactants to a product composed principally of an integrated microcrystalline structure and
   finally removing said formed material.

3. The process as claimed in claim 2, wherein said superheated steam measures at least about 450° F.

4. The process as claimed in claim 2, wherein said superheated steam measures between about 500° F. and 580° F.

5. The method as claimed in claim 2, wherein a superheated steam atmosphere is brought into contact with said reactants before the conversion of said reactants to an integrated, crystalline, network structure.

6. The method as claimed in claim 2, wherein the lime and silica are combined in the mol ratio of at least 0.65 mol lime to 1.0 mol of silica.

7. The method as claimed in claim 6, wherein said slurry possesses a water/solids weight ratio of from about 0:1 to 1:1.

8. The method as claimed in claim 7, wherein said superheated steam is at a temperature between about 500° F. and 580° F.

9. The method as claimed in claim 8, wherein the induration pressure is maintained at about 250 pounds per square inch gauge and the induration temperature at about 406° F.

10. The process of producing a formed dry, solid insulating material of the calcium silicate type comprising the steps of:
    preparing a slurry mixture including lime, silica and water,
    locating said slurry in a mold,
    providing a closed chamber,
    locating said slurry-containing mold in said closed chamber,
    establishing a saturated steam atmosphere within said chamber in order to promote steam induration reaction of said reactants, but
    prior to said establishment of a saturated steam atmosphere,
    flowing superheated steam into said chamber,
    discontinuing the flow of said superheat once the saturated steam atmosphere is established, then
    continuing saturated steam induration reaction of said slurry reactants for from 1 to 15 hours at respectively from about 400 pounds per square inch gauge (448° F.) to about 110 pounds per square inch gauge (344° F.) to convert said slurry reactants to a formed product, said superheated steam flow continuing for from about 10 to about 30 minutes before saturated steam conditions are established.

11. The process of producing an insulating calcium silicate body of integrated microcrystalline structure, comprising the steps of:
    preparing a slurry mixture including lime, silica and water,
    locating said slurry in a mold,
    providing a closed chamber,
    locating said slurry-containing mold in said closed chamber,
    establishing a saturated steam atmosphere measuring about 250 pounds per square inch gauge and a corresponding temperature of 406° F. within said chamber in order to promote steam induration reaction of said reactants, but
    prior to said establishment of said 250 pounds per square inch gauge pressure and corresponding temperature of 406° F.,
    introducing superheated steam into said chamber,
    continuing said introduction of additional superheated steam for from 30 minutes to 1 hour,
    discontinuing the flow of said superheat once the said 250 pound pressure and 406° F. temperature is established, then
    continuing saturated steam induration reaction of said slurry reactants at said 250 pound pressure and 406° F. temperature to form said body.

12. The process of producing a solid insulating material of the calcium silicate type comprising the steps of:
    preparing a slurry mixture including, as reactants, lime, silica and water,
    locating said slurry in a mold,
    providing a closed chamber,
    locating said slurry-containing mold in said closed chamber,
    introducing saturated steam into said autoclave until a totally saturated steam atmosphere is achieved in said chamber whereby, before said saturated atmosphere is achieved, said reactants are transformed into a gelatinous phase,
    introducing superheated steam into said chamber into contact with said gelatinous phase for about 10 to about 60 minutes, then
    continuing saturated steam induration reaction of said slurry reactants to convert said gelatinous phase to a product composed principally of an integrated microcrystalline structure, and finally
    removing said crystalline reaction product insulating material from said chamber and said mold.

13. In the process of producing insulating materials of the calcium silicate type wherein
   reactant ingredients including lime, silica and water are combined to form a slurry,
   said slurry located in a mold,
   an autoclave is provided,
   said slurry in the mold located in said autoclave and steam is introduced into said autoclave to create a saturated steam atmosphere which is continued for from 1 to 14 hours to form an integrated microcrystalline structure from said slurry reactants, said reactants existing for a time as a gelatinous phase,
   the improvement which comprises
   introducing superheated steam into contact with said slurry prior to the achievement of the saturated steam atmosphere.

14. The method in accordance with claim 13, wherein the superheated steam measures at least about 450° F.

15. The method in accordance with claim 13, wherein the superheated steam measures from about 500° F. to about 580° F.

16. The method as claimed in claim 15, wherein said introduction of superheated steam is continued for at least 15 minutes but not more than 60 minutes.

17. The method as claimed in claim 16, wherein said introduction of superheated steam is continued for from about 30 minutes to about 60 minutes.

References Cited by the Examiner

UNITED STATES PATENTS

| | | | |
|---|---|---|---|
| 681,580 | 8/1901 | Resing | 264—345 |
| 744,432 | 11/1903 | Sutcliffe. | |
| 1,446,213 | 12/1921 | Roucka. | |
| 1,899,137 | 2/1933 | Crume. | |
| 2,432,981 | 12/1947 | Abrahams | 264—333 |

ROBERT F. WHITE, *Primary Examiner.*

ALEXANDER H. BRODMERKEL, *Examiner.*